US009244916B2

(12) United States Patent
Berger et al.

(10) Patent No.: US 9,244,916 B2
(45) Date of Patent: Jan. 26, 2016

(54) DOWNLOADING MEDIA OBJECTS

(71) Applicant: Penthera Partners, Inc., Pittsburgh, PA (US)

(72) Inventors: Adam L. Berger, Pittsburgh, PA (US); Joshua Pressnell, Dayton, OH (US)

(73) Assignee: Penthera Partners, Inc., Pittsburgh, PA (US)

( * ) Notice: Subject to any disclaimer, the term of this patent is extended or adjusted under 35 U.S.C. 154(b) by 0 days.

(21) Appl. No.: 14/042,952

(22) Filed: Oct. 1, 2013

(65) Prior Publication Data
US 2015/0095460 A1 Apr. 2, 2015

(51) Int. Cl.
| *G06F 17/30* | (2006.01) |
| *H04L 29/08* | (2006.01) |
| *H04L 29/06* | (2006.01) |
| *H04N 21/00* | (2011.01) |
| *H04W 4/18* | (2009.01) |

(52) U.S. Cl.
CPC .............. *G06F 17/30* (2013.01); *H04L 65/00* (2013.01); *H04L 67/06* (2013.01); *H04L 67/289* (2013.01); *H04L 67/2847* (2013.01); *H04L 67/2861* (2013.01); *H04N 21/00* (2013.01); *H04W 4/18* (2013.01)

(58) Field of Classification Search
CPC .......... H04N 7/00; H04N 5/00; H04L 65/608; H04L 29/08117; H04L 67/06; H04M 7/0039; G06F 17/30023; G06F 17/30
USPC .......................................... 709/231; 707/609
See application file for complete search history.

(56) References Cited

U.S. PATENT DOCUMENTS

| 5,850,518 | A  | * | 12/1998 | Northrup .................... 709/203 |
| 5,893,077 | A  | * | 4/1999 | Griffin ............................ 705/34 |
| 6,611,813 | B1 | * | 8/2003 | Bratton .................... 705/26.1 |
| 7,164,368 | B1 | * | 1/2007 | Ireland ........................... 341/34 |
| 7,689,541 | B1 | * | 3/2010 | Le Grand .............. 707/999.002 |
| 8,015,253 | B1 | * | 9/2011 | Zapata et al. ................. 709/206 |
| 8,413,151 | B1 | * | 4/2013 | Stratton et al. ............... 718/102 |
| 8,959,244 | B2 | * | 2/2015 | Lin et al. ...................... 709/232 |
| 2001/0051998 | A1 | * | 12/2001 | Henderson .................... 709/217 |
| 2002/0103822 | A1 | * | 8/2002 | Miller ............... G06F 17/30896 715/201 |
| 2002/0133491 | A1 | * | 9/2002 | Sim et al. ........................ 707/10 |
| 2002/0143629 | A1 | * | 10/2002 | Mineyama et al. ............ 705/14 |
| 2003/0033325 | A1 | * | 2/2003 | Boogaard ............. G11B 20/10 |
| 2003/0110416 | A1 | * | 6/2003 | Morrison et al. ............... 714/39 |
| 2006/0041840 | A1 | * | 2/2006 | Blair et al. .................... 715/513 |
| 2006/0160543 | A1 | * | 7/2006 | Mashinsky ................ 455/452.2 |
| 2006/0181982 | A1 | * | 8/2006 | Villevieille et al. .......... 369/47.1 |
| 2006/0199548 | A1 | * | 9/2006 | Saraby ....................... 455/67.13 |
| 2007/0005795 | A1 | * | 1/2007 | Gonzalez .......... G06F 17/30017 709/232 |
| 2007/0061759 | A1 | * | 3/2007 | Klein, Jr. ...................... 715/853 |

(Continued)

FOREIGN PATENT DOCUMENTS

WO WO2015050651 4/2015

OTHER PUBLICATIONS

Merriam-Webster, "stream", 2015.*

(Continued)

*Primary Examiner* — O. C. Vostal
(74) *Attorney, Agent, or Firm* — Fish & Richardson P.C.

(57) ABSTRACT

Among other things, two or more files are processed that each represent, in a streaming format, a portion of a media item. A file download facility at a user device can download the two or more processed files as if they were a single file.

27 Claims, 11 Drawing Sheets

(56) References Cited

U.S. PATENT DOCUMENTS

Figure 1:
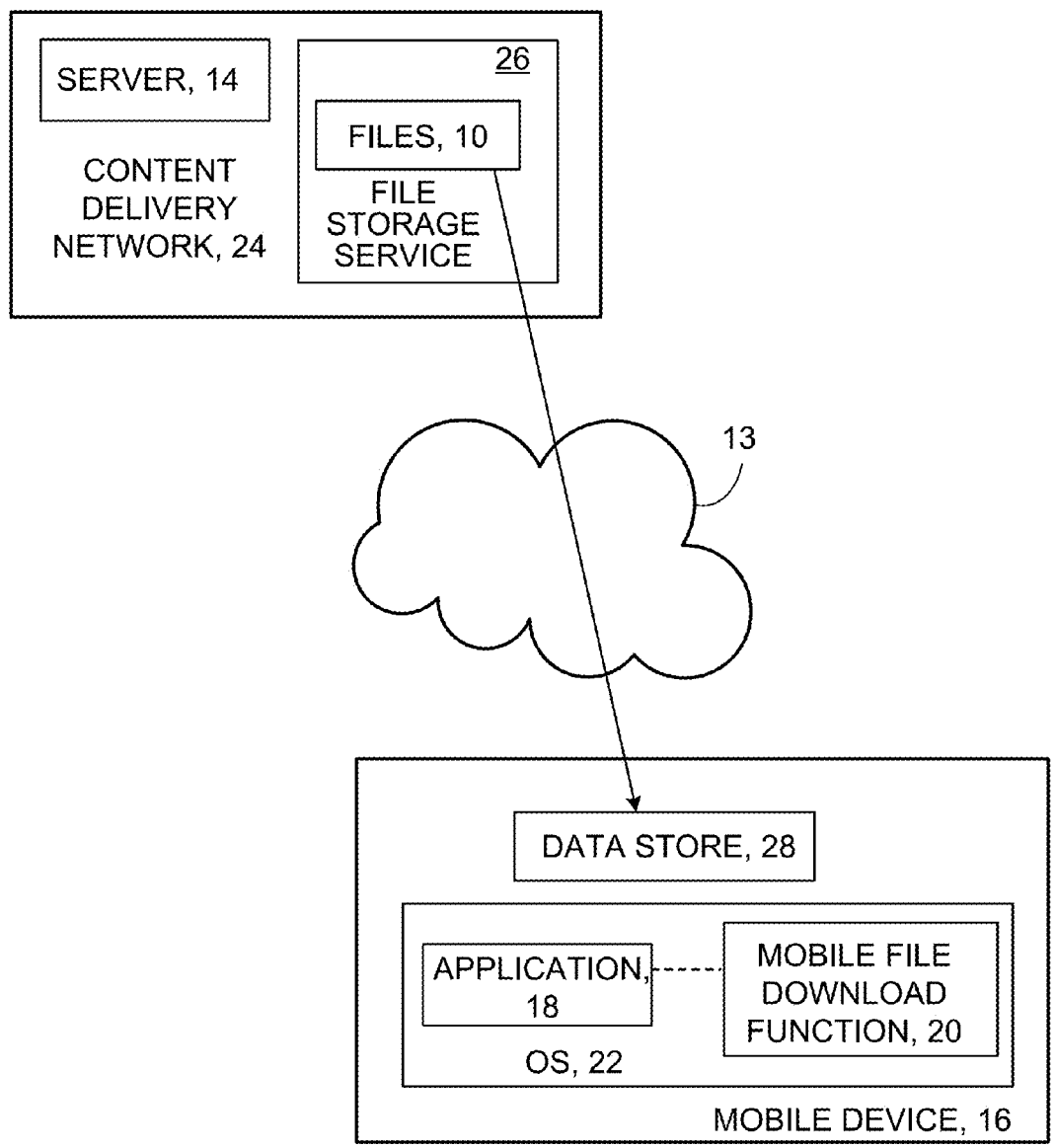

| | | | |
|---|---|---|---|
| 2007/0162571 A1* | 7/2007 | Gupta et al. | 709/219 |
| 2007/0204057 A1* | 8/2007 | Shaver | G06F 17/30902 |
| | | | 709/231 |
| 2007/0294422 A1* | 12/2007 | Zuckerman et al. | 709/230 |
| 2008/0010372 A1* | 1/2008 | Khedouri et al. | 709/224 |
| 2008/0032739 A1* | 2/2008 | Hoodbhoy et al. | 455/556.2 |
| 2008/0098301 A1* | 4/2008 | Black | H04L 67/1008 |
| | | | 715/246 |
| 2008/0207200 A1* | 8/2008 | Fein et al. | 455/426.1 |
| 2008/0289006 A1 | 11/2008 | Hock et al. | |
| 2009/0001173 A1* | 1/2009 | Sevier | G06K 7/10851 |
| | | | 235/462.41 |
| 2009/0025048 A1* | 1/2009 | Ganesan | G06F 17/30017 |
| | | | 725/92 |
| 2009/0037515 A1* | 2/2009 | Zapata et al. | 709/202 |
| 2009/0061925 A1* | 3/2009 | Finkelstein et al. | 455/552.1 |
| 2009/0070841 A1* | 3/2009 | Buga et al. | 725/116 |
| 2009/0074051 A1* | 3/2009 | Manapragada et al. | 375/240 |
| 2009/0094113 A1 | 4/2009 | Berry et al. | |
| 2009/0119730 A1* | 5/2009 | Perlman | A63F 13/12 |
| | | | 715/114 |
| 2009/0150558 A1* | 6/2009 | Lee et al. | 709/231 |
| 2009/0185788 A1* | 7/2009 | Lee et al. | 386/83 |
| 2009/0303231 A1* | 12/2009 | Robinet et al. | 345/419 |
| 2009/0327976 A1* | 12/2009 | Williamson et al. | 715/863 |
| 2010/0125628 A1* | 5/2010 | Huysegems et al. | 709/203 |
| 2010/0185854 A1* | 7/2010 | Burns et al. | 713/165 |
| 2010/0198982 A1* | 8/2010 | Fernandez | G06Q 30/02 |
| | | | 709/231 |
| 2010/0235762 A1* | 9/2010 | Laiho et al. | 715/753 |
| 2011/0066749 A1* | 3/2011 | Alstrup et al. | 709/231 |
| 2011/0087794 A1* | 4/2011 | Li | H04N 5/765 |
| | | | 709/231 |
| 2011/0191812 A1* | 8/2011 | Cory | H04N 7/173 |
| | | | 725/109 |
| 2011/0252118 A1* | 10/2011 | Pantos et al. | 709/219 |
| 2011/0276993 A1* | 11/2011 | Ferguson | 725/30 |
| 2011/0295980 A1 | 12/2011 | Aldis et al. | |
| 2011/0306386 A1* | 12/2011 | Centoza | H04W 28/08 |
| | | | 455/552.1 |
| 2012/0005365 A1* | 1/2012 | Ma et al. | 709/231 |
| 2012/0054818 A1* | 3/2012 | Noh et al. | 725/143 |
| 2012/0170906 A1* | 7/2012 | Soroushian et al. | 386/241 |
| 2012/0198041 A1* | 8/2012 | Black et al. | 709/223 |
| 2012/0198042 A1* | 8/2012 | Dunbar et al. | 709/223 |
| 2012/0198333 A1 | 8/2012 | Kramer et al. | |
| 2012/0254456 A1* | 10/2012 | Visharam | H04N 21/2343 |
| | | | 709/231 |
| 2012/0254565 A1* | 10/2012 | Mitra et al. | 711/161 |
| 2012/0265029 A1* | 10/2012 | Fahey | 600/301 |
| 2012/0278728 A1* | 11/2012 | Malin et al. | 715/748 |
| 2012/0331168 A1* | 12/2012 | Chen | 709/231 |
| 2013/0018899 A1* | 1/2013 | Hargreaves et al. | 707/754 |
| 2013/0054837 A1* | 2/2013 | von Elgg et al. | 709/247 |
| 2013/0100944 A1* | 4/2013 | Kwon | H04W 76/026 |
| | | | 370/338 |
| 2013/0165208 A1* | 6/2013 | Nelson et al. | 463/25 |
| 2013/0179913 A1* | 7/2013 | Haberman et al. | 725/14 |
| 2013/0185488 A1* | 7/2013 | Talagala et al. | 711/103 |
| 2013/0227080 A1* | 8/2013 | Gao et al. | 709/219 |
| 2013/0232198 A1* | 9/2013 | Tenbrock | 709/204 |
| 2013/0238740 A1* | 9/2013 | Vass et al. | 709/213 |
| 2013/0283393 A1* | 10/2013 | Hierro et al. | 726/27 |
| 2013/0297466 A1* | 11/2013 | Rossato | H04N 21/234327 |
| | | | 705/30 |
| 2013/0311775 A1* | 11/2013 | Nair et al. | 713/167 |
| 2013/0336320 A1* | 12/2013 | Rangaraman | 370/392 |
| 2014/0012949 A1* | 1/2014 | Meyers | H04L 67/1095 |
| | | | 709/217 |
| 2014/0059244 A1* | 2/2014 | Panje et al. | 709/231 |
| 2014/0095667 A1* | 4/2014 | Quan et al. | 709/219 |
| 2014/0108495 A1* | 4/2014 | Benno | 709/203 |
| 2014/0129676 A1* | 5/2014 | Zeng et al. | 709/217 |
| 2014/0198641 A1* | 7/2014 | Perkuhn et al. | 370/230 |
| 2014/0215536 A1* | 7/2014 | Maxwell | H04N 21/47202 |
| | | | 725/87 |
| 2014/0245359 A1* | 8/2014 | De Foy et al. | 725/62 |
| 2014/0279852 A1* | 9/2014 | Chen | 707/609 |
| 2014/0280990 A1* | 9/2014 | Dove | H04L 65/601 |
| | | | 709/228 |
| 2014/0355955 A1* | 12/2014 | Berger | G06Q 30/00 |
| | | | 386/248 |
| 2014/0365677 A1* | 12/2014 | Mueller et al. | 709/231 |

OTHER PUBLICATIONS

Merriam-Webster, "streaming", 2015.*
Arya et al., "A Methodology for Selecting Experiments to Measure Energy Costs in Smartphones", 2011.*
Merriam-Webster, "download", 2015.*
Talukdar et al., "Streaming Video Capacities of LTE Air-interface", 2010.*
Yates et al., "Postcards from the Edge: A Cache-and Forward Architecture for the Future Internet", 2008.*
Paul et al., "The Cache-and Forward Network Architecture for Efficient Mobile Content Delivery Servcies in the Future Internet", 2008.*
Alumaula et al., "Cache & Carry: Predictive Content Caching in Intermittently Connected Mobile Devices", 2006.*
Liu et al., "A survey on peer-to-peer video streaming systems", 2008.*
Yates et al., "NeTS-FINDS: Postcards for the Edge: A Cache-and-Forward Architecture for the Future Internet", 2006 Fiscal Year.*
International Search Report and Written Opinion from PCT application PCT/US2014/053196 issued on Feb. 9, 2015 (13 pages).

* cited by examiner

PACKAGER CONCATENATES MULTIPLE FRAGMENTS
FIG. 8
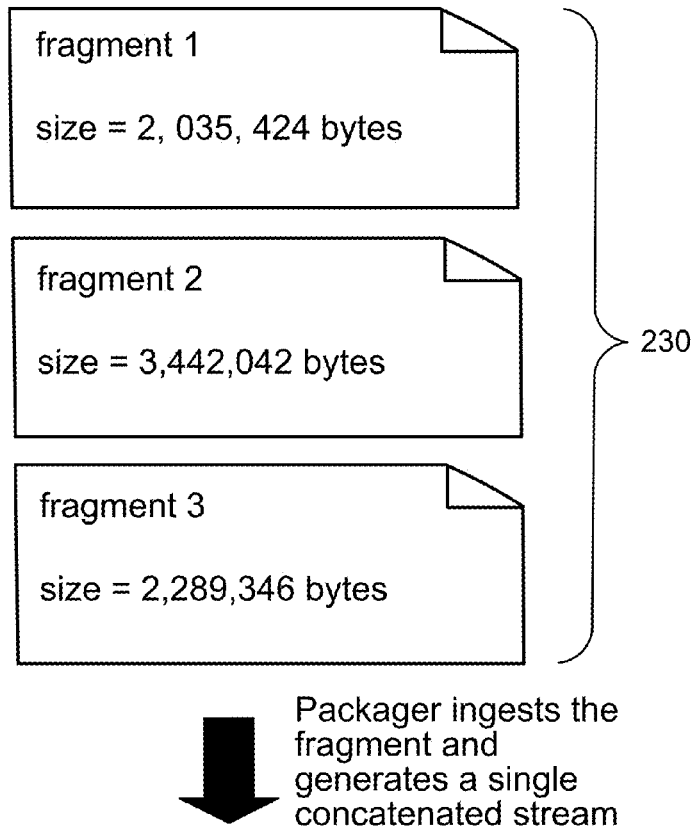
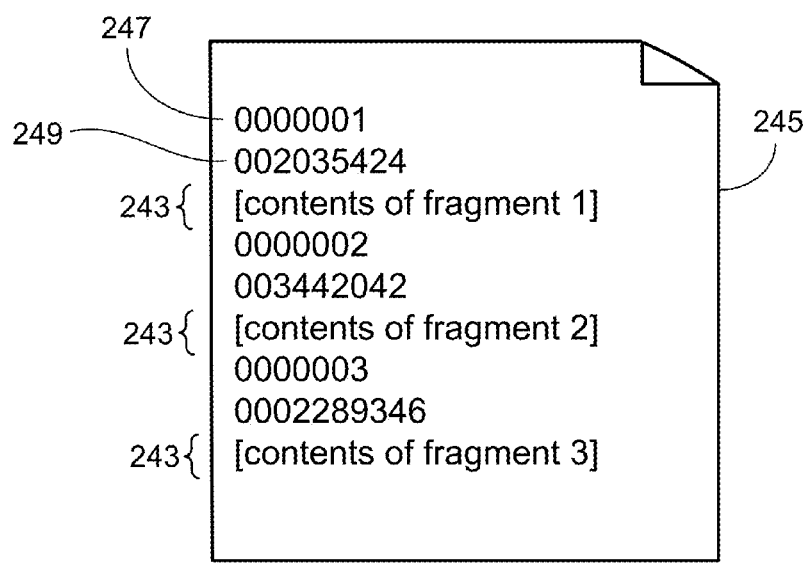

DOWNLOADING MEDIA OBJECTS

BACKGROUND

This description relates to downloading media objects.

As shown in FIG. 1, media objects such as files 10, for example, can be downloaded 12 by a server 14 through a communication channel 13 to a mobile device 16. To facilitate this download, an application (app) 18 running on the mobile device may use a mobile file download (MFD) function 20 provided by the device's operating system (OS) 22.

For example, a news app can request download of a 10-minute "news update" video once per day. Once the app requests the download, a mobile file download (MFD) function of the OS (for example, the NSUrlSession API in Apple's iOS7 operating system) takes responsibility for downloading the file from the server. The server may be part of a content delivery network (CDN) 24 that includes a file storage service 26 where the file is stored.

The OS may signal the app when the download is finished, so that the app can, e.g., notify the user or update the app's internal data store 28.

Media objects are often packaged as many small files expressed in a streaming format. The small files are often called "fragments." When a mobile device is connected to the Internet, the device can download these fragments sequentially and render them (for example, present a video to a user of the device) while downloading; this concurrent "download-and-play" process is typically called 'streaming.' Usually the device discards the downloaded fragment shortly after it has been played. Streaming uses an Internet connection during playout of the media object. To allow a mobile device to play out a media object when the device does not have an Internet connection, the mobile device can download the media object before playout. Doing so may require the mobile device to download the fragments comprising the media object. However, in some cases, MFD systems are not designed to handle the download of many files.

SUMMARY

Here, we describe a process and system for using, for example, an MFD system to download a media object having many constituent files expressed in streaming format for later playout on the mobile device.

In general, in an aspect, two or more files are processed that each represent, in a streaming format, a portion of a media item. A file download facility at a user device can download the two or more processed files as if they were a single file.

Implementations may include one or a combination of any two or more of the following features. The content item includes a video. The content item includes a TV show. The file download facility includes an MFD of an OS. The download is from a facility associated with a CDN. The number of files processed is at least 100. The number of files processed is at least 1000. The processing includes inserting the streaming-format files into a single file and downloading the single file to the user device. The processing includes also delivering to the user device information indicative of the beginning of each of the streaming-format files in the single file. The indicative information is inserted into the single file. The indicative information includes a unique identifier for each of the streaming-format files in the single file. All of the files that represent the entire content item are processed. Two or more files are downloaded as a single file in response to a download request from a download facility of the user device. A manifest file is downloaded to the user device that lists the files that represent the portion of the content item. The user device includes a mobile device.

In general, in an aspect, an identifier is sent from a user device of a streaming-formatted fragment that has been received as part of a delivery of multiple streaming-formatted fragments that represent portions of a content item.

Implementations may include one or a combination of any two or more of the following features. The identifier includes a unique identifier of the streaming-formatted fragment with respect to a set of streaming-formatted fragments that together represent the entire content item. The identifier includes an identifier of a recently completely received streaming-formatted fragment for the content item. The identifier includes an identifier of the most recently completely received streaming-formatted fragment for the content item.

In general, in an aspect, in connection with an interruption of a delivery to a user device of streaming-formatted fragments that represent portions of a content item, a processing of the streaming-formatted fragments is restarted at a server. The fragments are delivered to the user device based on an indication of fragments that have been successfully received from the user device.

Implementations may include one or a combination of any two or more of the following features. The interruption of the delivery includes a deterioration of an Internet connection between the server and the user device. The interruption of the delivery includes a deterioration of the power level (e.g., battery charge) of the user device. The interruption of the delivery includes a change in an amount of storage space of the user device. The interruption of the delivery includes a loss of WiFi access of the user device. The interruption of the delivery includes reaching a quota in amount of data consumed by the user device over a period of time. The interruption of the delivery includes execution of a higher-priority task on the user device. The processing includes inserting the streaming-formatted fragments in a single file for delivery to the user device. The indication of fragments that have been successfully received from the user device includes a unique identifier of a fragment that has most recently been successfully received by the user device. The server includes a CDN, the content item includes a video, and the user device includes a mobile device.

In general, in an aspect, at a device to which streaming-formatted fragments that represent at least some portions of a content item have been delivered, the fragments of the content item are played out in sequence in a streaming mode by using manifest file information to point to the location of each of the fragments either locally, if the fragment has been stored locally, or remotely if the fragment has not been stored locally.

Implementations may include one or a combination of any two or more of the following features. The manifest file information is a revised version of an original manifest file received at the device. The content item includes a video, the streaming-formatted fragments represent all of the video, and there is a continuous playing out of the all of the video. Each of the fragments stored locally has been reconstituted from a file containing more than one of the fragments, the file having been received from a server.

In general, in an aspect, in response to a request from a file download facility at a user device, two or more files are delivered that each represent, in a streaming format, a portion of a content item, the two or more files being delivered as part of a single file download to the user device.

In general, in an aspect, in connection with an interruption of a delivery to a user device of streaming-formatted fragments that represent portions of a content item, processing of streaming-formatted fragments is restarted. The fragments are delivered to the user device based on an indication of fragments that have been successfully received from the user device.

In general, in an aspect, at a device to which streaming-formatted fragments that represent at least some portions of a content item have been delivered, the fragments of the content item are played out in sequence in a streaming mode by using manifest file information to point to the location of each of the fragments either locally, if the fragment has been stored locally, or remotely if the fragment is not been stored locally.

In general, in an aspect, with respect to play out that has occurred at a user device, of streaming-formatted fragments that are stored on the device and that represent at least portions of a content item, the play out is continued at the user device of streaming-formatted fragments that are delivered from a server.

In general, in an aspect, at a user device and without interruption, a series of streaming-formatted fragments is played out that represent at least a continuous portion of a content item. At least one of the streaming-formatted fragments is played out from streaming-formatted fragments that are stored on the user device. At least one of the streaming-formatted fragments is played out from streaming-formatted fragments that are received on the user device from a server.

In general, in an aspect, a file is downloaded to a user device from a server. The file contains information representing two or more streaming-formatted fragments that correspond to at least a portion of the content item to be played out in a streaming mode at the user device. The streaming-formatted fragments are reconstituted from the downloaded file and stored on the device for play out.

In general, in an aspect, a number of streaming-formatted fragments that together represent an entire TV show are fetched from a CDN. The streaming-formatted fragments are used to form a number of one or more files to be downloaded to a user device in response to a corresponding number of download requests from a download facility running on the user device. The number of the files to be downloaded is at least an order of magnitude fewer than the number of streaming-formatted fragments that together represent the entire TV show. Each of the files to be downloaded is formed by inserting two or more of the streaming-formatted fragments and information from which each of the streaming-formatted fragments can be identified distinctly. A manifest is provided to the user device that uniquely identifies each of the streaming-formatted fragments. Each of the files is downloaded in response to a corresponding download request from the download facility running on the user device.

In general, in an aspect, at a user device, a request is received from an app running on the device to download an entire TV show from a CDN for play out on the device. A request is made by a download facility of the app to the CDN for download of a file representing the entire TV show. The file contains streaming-formatted fragments that together represent the entire TV show and information that uniquely identifies each of the streaming-formatted fragment the file is received from the CDN. Each of the streaming-formatted fragments is reconstituted and stored using the information that uniquely identifies the fragments. The entire TV show is played out continuously by streaming each of the stored streaming-formatted fragments in turn.

These and other aspects, features, and implementations can be expressed as methods, systems, components, software, methods for doing business, means or steps for performing functions, and in other ways.

These and other features, aspects and implementations will become apparent from the following description, and from the claims.

DESCRIPTION

Figure 3:
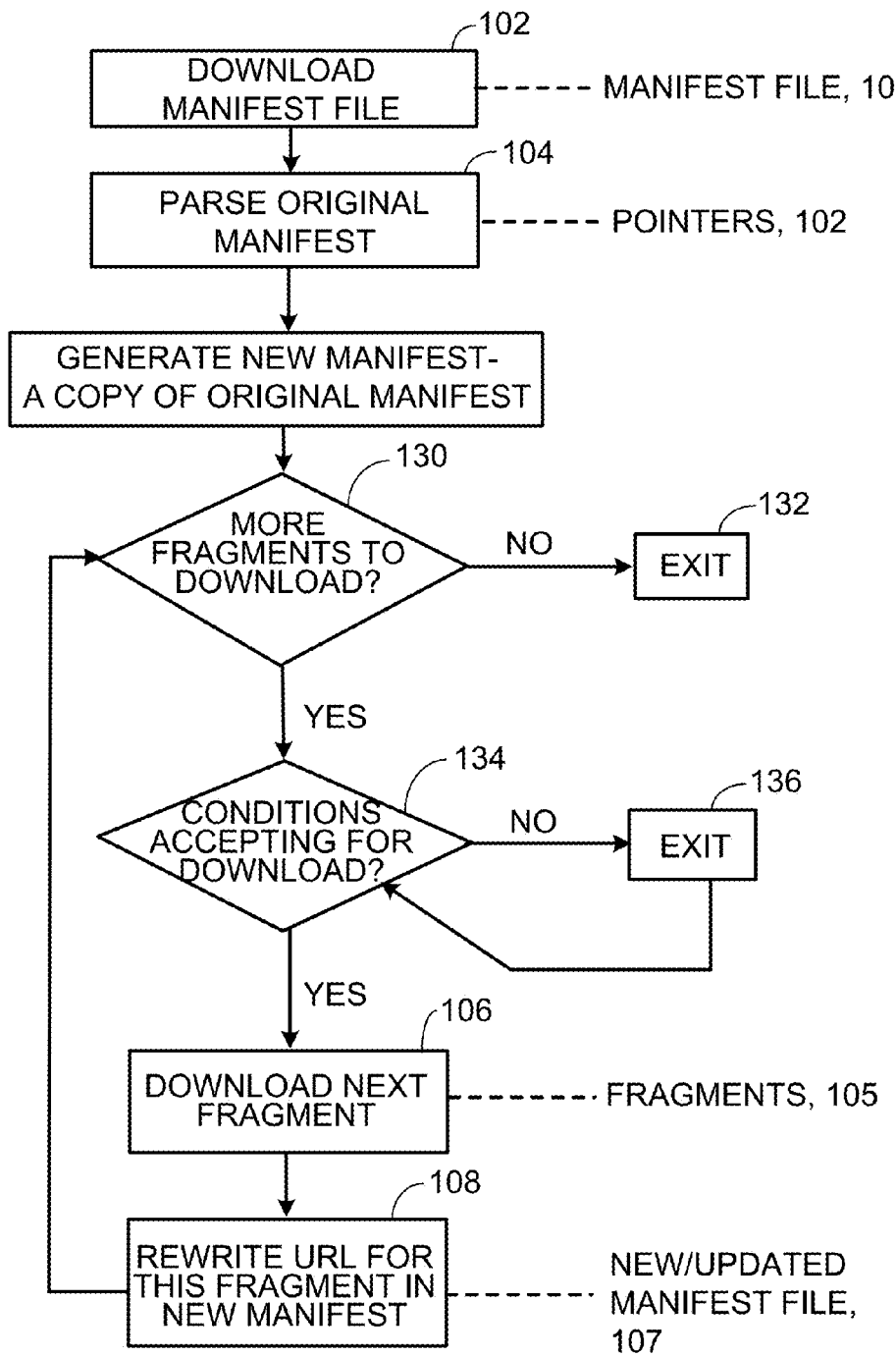
Figure 4:
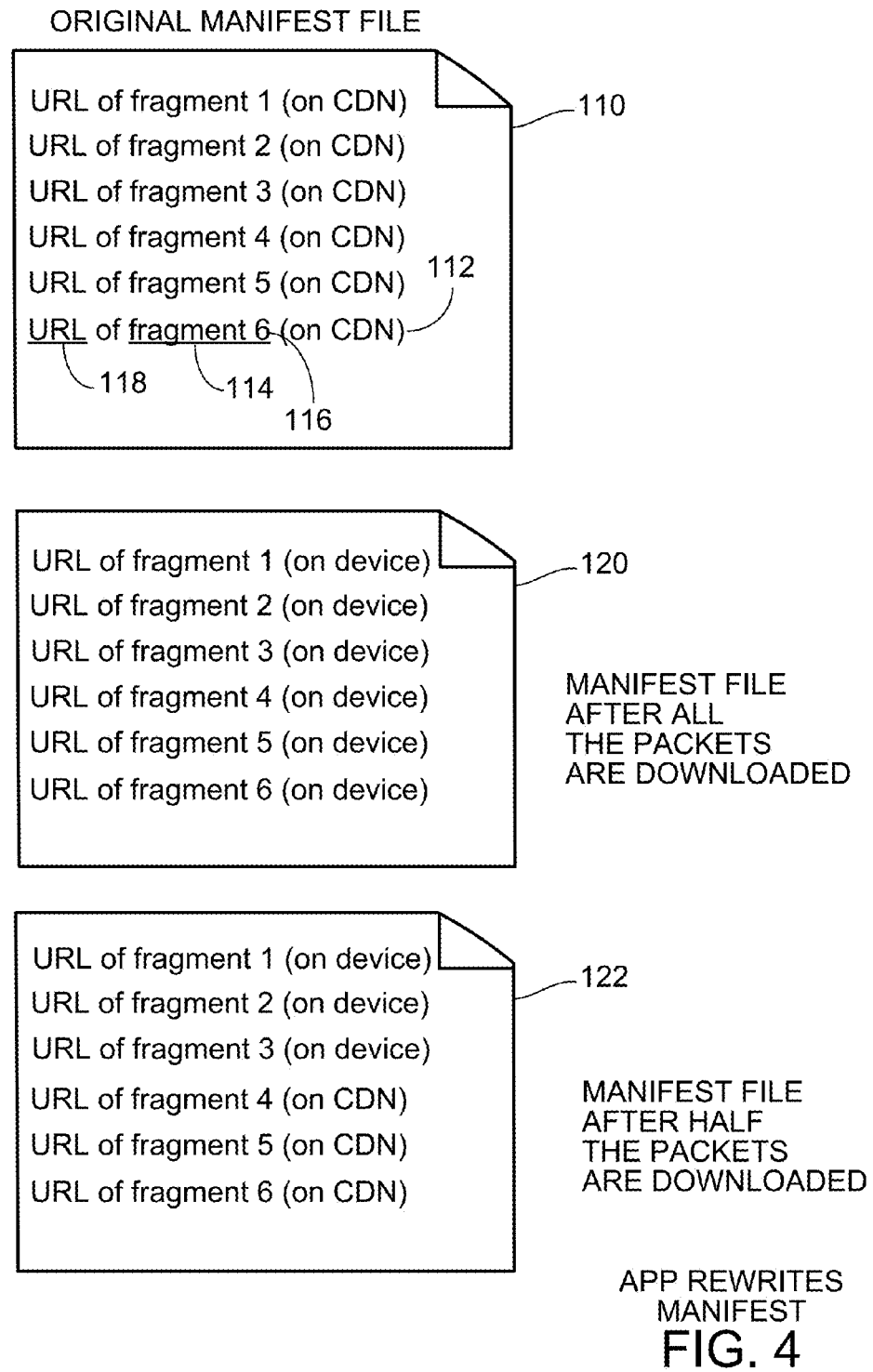
Figure 9:
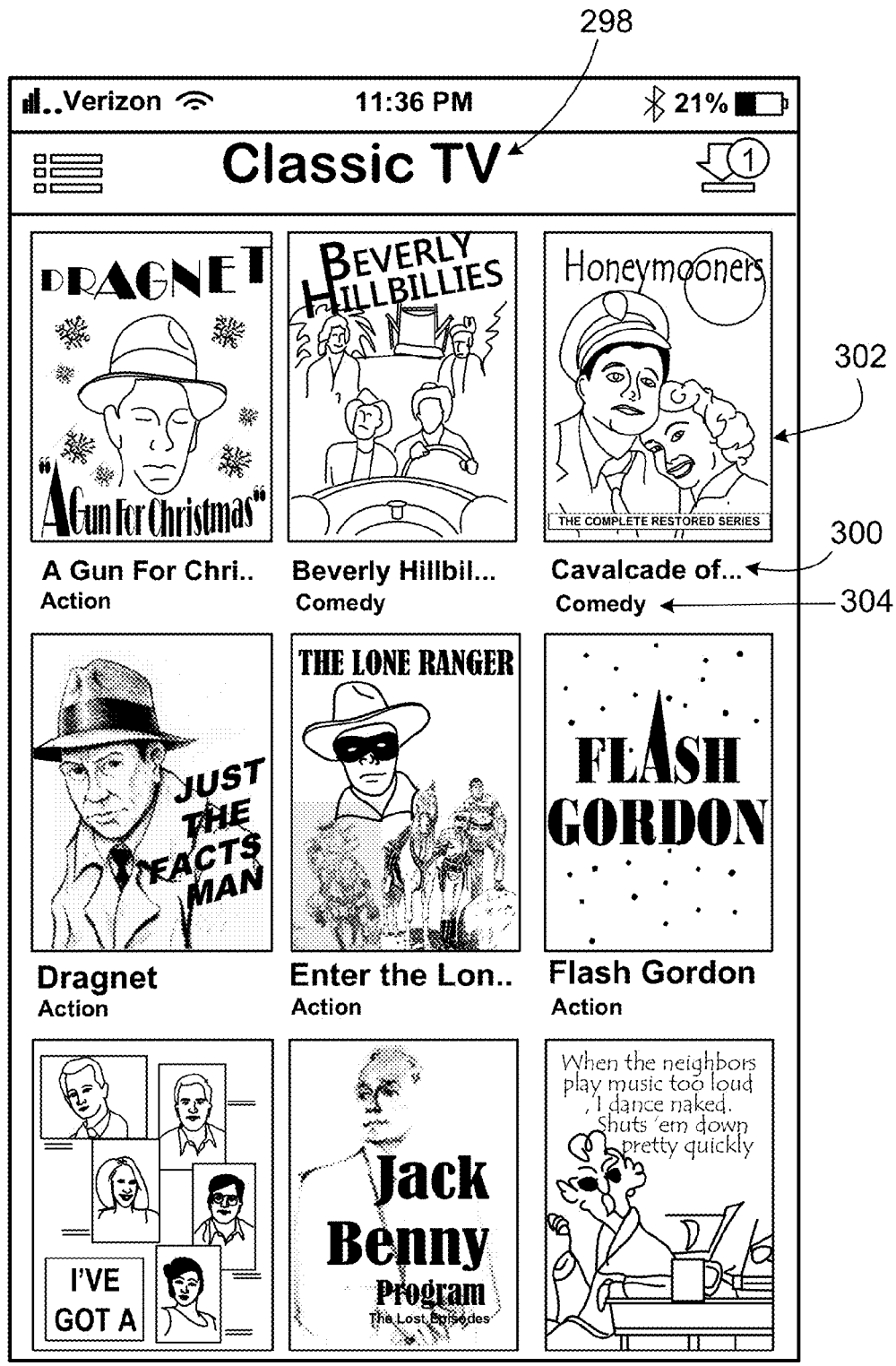
Figure 10:
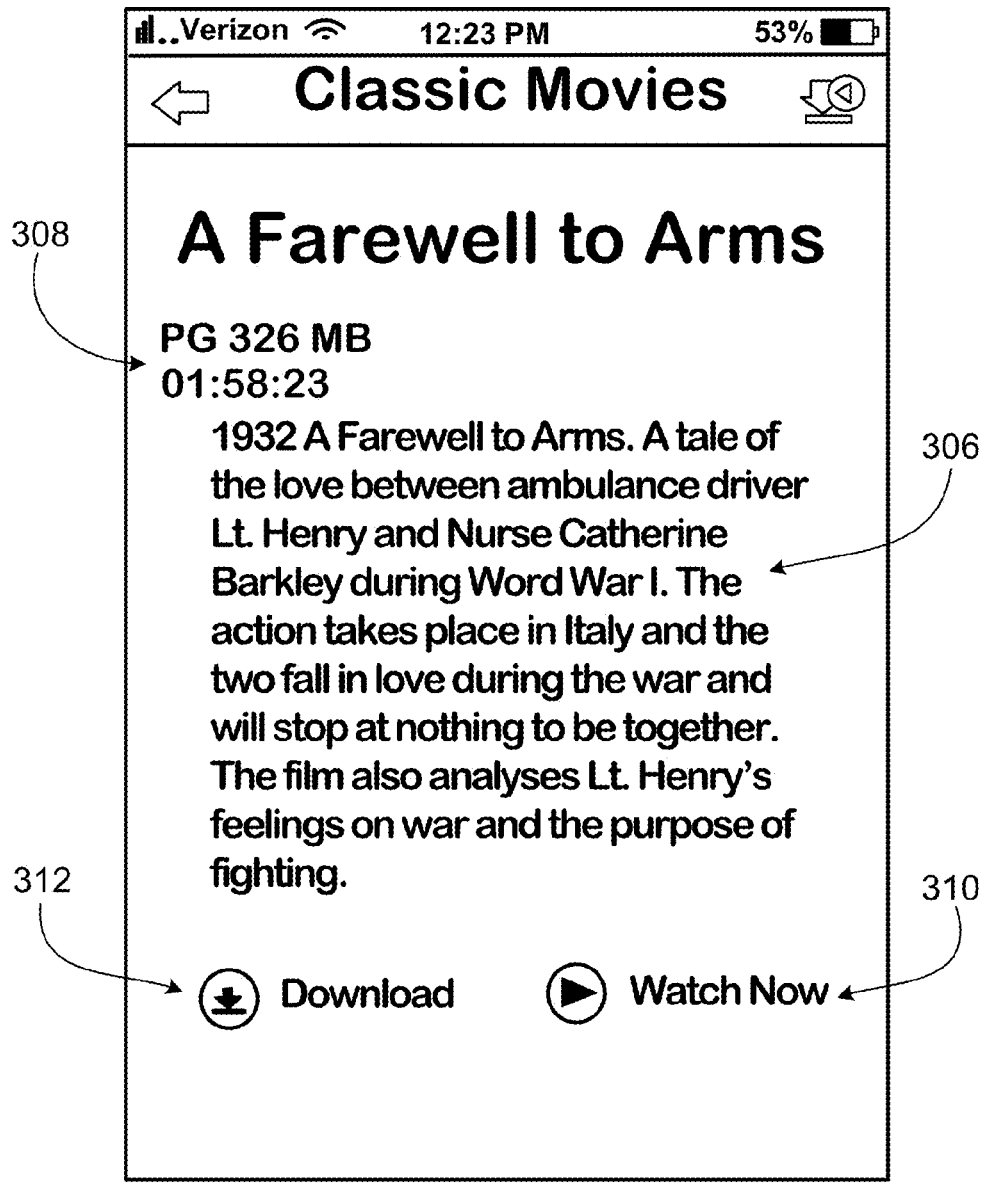
Figure 11:
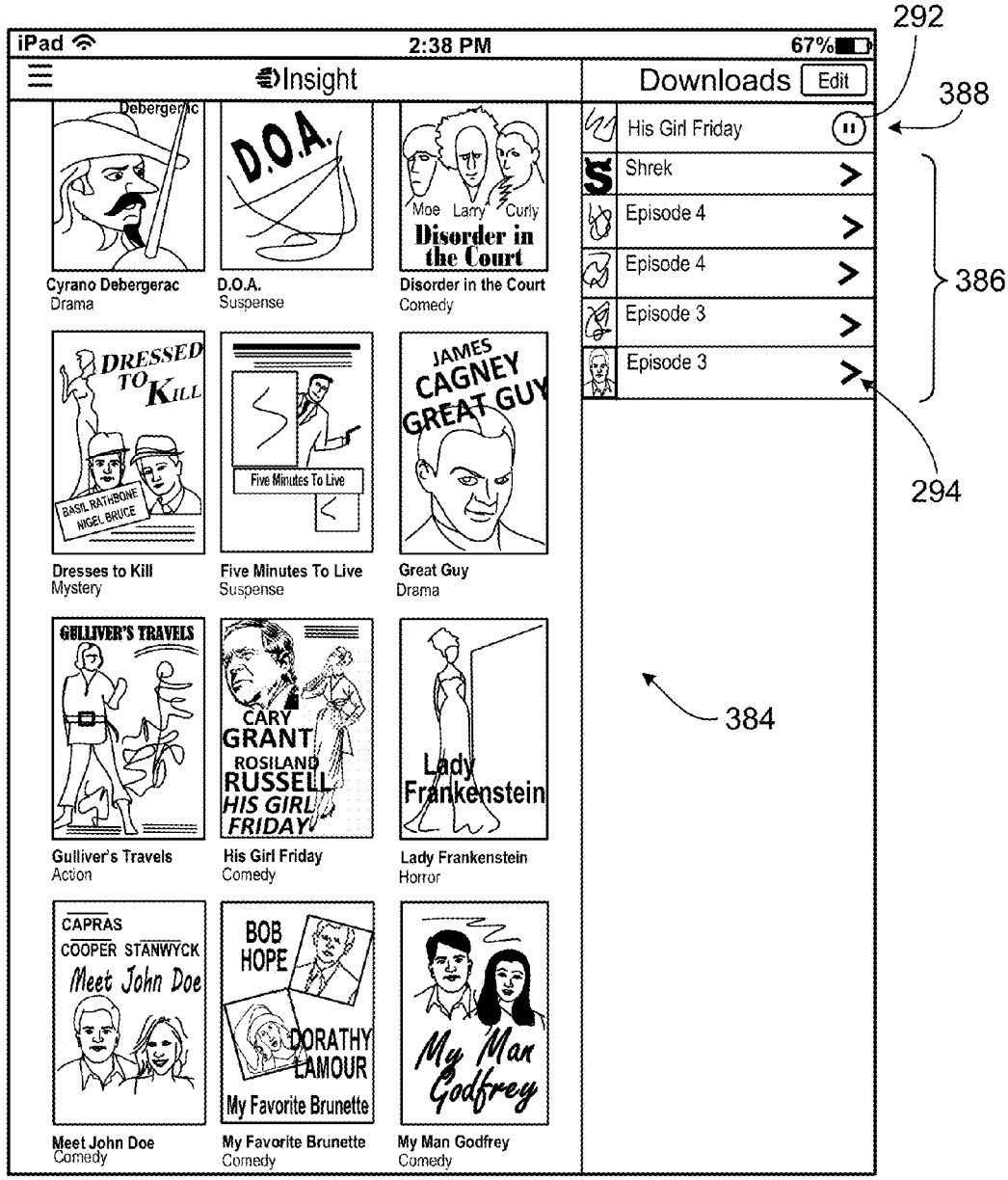

FIGS. 1, 2, 5, and 7 are block diagrams.
FIG. 3 is a flow diagram.
FIG. 4 is a schematic diagram of a manifest file.
FIG. 6 is a front view of a mobile device.
FIG. 8 is a schematic diagram.
FIGS. 9, 10, and 11 are screen shots.

In the following description, we use the term "device" broadly to include, for example, any computer, workstation, server, handheld device, mobile device, telephone, or other active electronic device. We include in the term "mobile device", for example, any device that can be easily transported, including a laptop, notebook, tablet, telephone, or other handheld device.

We use the term "app" or "application" or "mobile app" broadly to include, for example, an executable binary that is installed and runs on a mobile device, or a web site to which the user navigates within a web browser on the mobile device, or a combination of them. An "app" may also refer to multiple executable binaries that work in conjunction on a mobile device to perform one or more functions; for example, an Android service and an Android application that communicate with one another. We use the term "app" in the context of video broadly to include, for example, any software, hardware, firmware, or combination of them that is able to access, accept, process, or play a video that is downloaded on or streamed to the mobile device.

We use the term "system" broadly to include, for example, any set of components or facilities—mobile app, streaming video server, content delivery network, and possibly other elements, for example—that together comprise or provide or support a service that delivers video to devices and plays them for users of the devices.

We use the term "streaming" broadly to include, for example, a service that allows a user to view a video on a device as the video is being delivered to the device, and in which the entire video is typically not stored persistently on the device.

We use the term "mobile device" broadly to include, for example, any portable device, such as a cellular-enabled phone, a tablet, or a laptop. A mobile device includes, for instance, any device that is capable of receiving a video stream over a wireless network and playing the video stream as it is received.

We use the term "playing" broadly to include, for example, presenting the video on the mobile device for viewing by the user. We sometimes use the terms "playback" or "playout" or "play out" interchangeably with "playing."

We use the term "wireless networks" broadly to include, for example, 3 G, 4 G, LTE, 802.11 (also known as "WiFi"), Bluetooth, and other protocols for wireless data delivery. We use the term "online" broadly to include, for example, having access to a network connection such as a connection to the Internet; and the term "offline" broadly to include, for example, not having access to a network connection or to a sufficiently robust network connection.

We use the term "streaming video server" broadly to include, for example, any server or other device accessible to the mobile device over a network connection and capable of delivering streaming video, for example, in conformity with Microsoft Smooth, Apple HLS, or other standard video-streaming protocols.

We use the term "downloading" broadly to include, for example, any transfer of a file across a communication channel from a remote location to a device so that the result of the downloading is that a copy of the file is stored on the device.

We use the term "non-volatile storage" or "persistent storage" broadly to include, for example, any technology that retains stored data, for example, even while the device is powered off, such as magnetic disk drive or solid-state memory. We use the term "data repository" broadly to include, for example, any storage mechanism from which data can be delivered to requesting devices over a network connection.

Streaming Video

Streaming video to mobile devices has become a mature and popular technology. Pay-TV distributors (e.g., Comcast, Time Warner Cable, Charter, Cox), TV networks (e.g., HBO, ABC, AMC), and various Internet-based services (e.g., Amazon, Netflix, YouTube) each offer services that stream video over IP (Internet protocol) networks to mobile devices.

Typically, so-called video streaming over IP relies on one of two common Internet communication standards: TCP (transmission control protocol) and UDP (user datagram protocol), each a protocol for delivering data on the Internet from one machine to another machine. Video streaming over IP can be performed in a unicast mode, i.e., one source delivering video to one receiver. In some cases, video streaming over IP can be performed in a broadcast or multicast mode, i.e., one source transmitting to multiple receivers.

In conjunction with TCP or UDP, streaming video services typically rely on enabling technologies such as video-encoding protocols (e.g., Apple's HLS format and Microsoft's Smooth format) that are designed for streaming video. These protocols allow the user to experience smooth playout of the video even as network conditions deteriorate or improve during playout. These protocols also allow for a minimal delay between the user's request for the video and the start of video playout. From a mobile device, a user may view streaming video that has been encoded by one of the protocols, using a web browser like Safari or Chrome running on the mobile device. A user may also view streaming video using an application installed and running on the mobile device, such as Hulu Plus, Netflix, HBOGO, or SkyGo.

In some cases, the streamed videos may be "premium" content (e.g., HBO), access to which requires, for example, a monthly subscription fee. Such premium content typically includes few or no commercials (we typically use the terms ads, advertisements, and commercials interchangeably). In some cases, the streamed videos may originate from ad-supported networks (e.g., ABC, AMC, Fox), in which case the video may include commercials before, during, and after playout, or any combination of two or more of those.

A streaming video service may offer VOD (video-on-demand) or live TV, or both. By VOD, we mean, for example, a video service that offers a catalog of videos from which the user may select and view an item. Each of the videos in a VOD catalog was created at some time in the past; therefore at the time when a video is being played, the entire video is already in existence. In contrast, a live TV service offers a group of video streams each of which is being created in real time during streaming. Therefore, at the time when a current portion of a live video stream is being played, later portions of the same video stream are being created. In that sense, a live TV video is incomplete during the time when it is being played.

Video Download

Recently, some companies have introduced a video download feature in their streaming products. Some companies have introduced exclusively video-download products, i.e., products that offer download but not streaming. In either case, video-download is a feature that allows users to download a video from a network data repository to a mobile device. Some examples of download-enabled services are Comcast's Xfinity Player and YouTube (reference: http://allthingsd.com/20130918/no-internet-no-problem-youtube-getting-ready-to-let-you-watch-videos-offline-on-your-phone/)

In download, the recipient device stores the video and can, for example, play out the video long after (e.g., minutes, days, weeks or longer) the delivery. The video item may consist of one file or of multiple files. The video item that is downloaded may be a VOD item or a live stream. In some cases, the mobile device may initiate the download process by, for example, transmitting an HTTP 'GET' request to a remote server that stores the object to be downloaded. In some cases, the mobile device may use a protocol, such as FTP, to fetch the video item from the remote source.

Among the advantages of a video-download feature are that a user can download a video from, for example, a VOD catalog when the user has access to a network connection, and the user is able to play the video later, when he or she does not have (or adequate) access to any network connection. For example, a user can download a TV show or movie to her mobile device while she is at home, before leaving for the airport. Later, while she is in an airplane, she can play out the downloaded video, even though she has limited or no Internet connectivity in the airplane.

An advantage of a video-download feature is that a user can consume high-quality videos from a VOD catalog even if the user only has access to a low-quality network connection. For example, imagine the user wants to view on her mobile device a 10-minute video, which has been encoded in three formats: low quality (0.3 Mb/s), medium quality (0.8 Mb/s) and high-quality (1.8 Mb/s). Say the user has a 0.6 Mb/s network connection. Over this network connection, she can only stream the low-quality (0.3 Mb/s) version of the video. Attempting to stream the medium- or high-quality version of the video would fail, since the network connection cannot support the required data throughput. However, she can download the high-quality version of the video, even over the 0.6 Mb/s network connection. Over this network connection, the download would require about 30 minutes. Once downloaded, the high-quality video is available at the mobile device for the user to play out. Thus, using download, a user can play out a high-quality video, even lacking a corresponding high-throughput network connection.

An advantage of a video-download feature is time-shifting from a time when a live TV show is being shown, for example, a rugby game scheduled for noon GMT, which is 4 AM Pacific Time, to a later time that is convenient for a rugby fan living in California. To do this, the fan can set his mobile device to record the show at 4 AM, and then the fan can watch the saved show at, e.g., 10 AM local time.

An advantage of a video-download feature is in reducing the use of expensive network connections. Typically, wireless operators like Verizon Wireless impose a monthly limit on cellular data usage, e.g., 2 GB per billing cycle, and impose an "overage" charge for data usage exceeding that limit in a given billing cycle. For instance, in mid-2013, the network operator Verizon Wireless assesses a $15 overage fee per GB used above the subscriber's limit in any one billing cycle. A Verizon Wireless subscriber with a 2 GB quota can stream about 5.5 hours of 800 Kb/s video in a given billing cycle over the Verizon network, before overage charges apply.

In other words, this Verizon Wireless subscriber is limited to about 5.5 hours of streaming video over the Verizon Wireless network until overage charges apply. A benefit of download is that Verizon Wireless subscribers who can plan ahead (and who have access to a download product) can download one or more videos in advance using a WiFi connection (e.g., at home or in their office), and subsequently watch these videos at a time and place where WiFi connectivity isn't available, thus avoid the risk of an expensive overage charge. In other words, download enables "wireless-mode shifting" that reduces one's cellular data consumption without reducing one's overall video consumption.

A system that supports the downloading of videos to a mobile device may have one or any combination of two or more of the following features:

- Using a mobile app or another tool (e.g., a web site, email, text messaging, or a TV set top box), the user may select a movie, an episode of a TV show, a live TV channel, or another video item and request that the video item be downloaded to the user's mobile device.
- Using a mobile app or another tool (e.g., a web site, email, text messaging, or a TV set top box), the user may select an episodic program (e.g., a weekly TV series, podcast, or radio program) and request that some or all new episodes of the series be automatically downloaded to the device as they become available.
- Using a mobile app or another tool (e.g., a web site, email, text messaging, or a TV set top box), the user may select an episodic program (e.g., a weekly TV series, podcast, or radio program) and request that some or all old episodes of the series be automatically downloaded to the device.
- The user may delete downloaded video items, one at a time or several at a time, from the mobile device.
- The system may automatically delete certain video items (e.g., older items, or items already viewed) to make room for new ones.
- The mobile app may transmit information related to its past activity (e.g. which video items it downloaded and when) to an analytics server.
- The system may employ a recommendation engine to identify videos that are of likely interest to the user, based on other videos the user has played and/or websites the user has visited, or other actions the users has taken. The recommendation engine may also rely on known behaviors of the user's friends (on social networks such as Facebook) to identify videos of likely interest. The system may automatically download these videos to the user's device.
- The mobile device may query a remote server automatically, recurrently, for the existence of one or more new videos that the user has subscribed to, or that the recommendation engine has selected for delivery to the device. Instead or in conjunction with such queries, a remote server may trigger the mobile device to initiate the download by transmitting a signal to the mobile device. Server-initiated signaling protocols include, for instance, APN (Apple Push Notification) for Apple mobile devices and GCM (Google Cloud Messaging) for Android devices.
- The user may view the status of currently-downloading videos and videos that are queued for download. The status may include, for example, the number of bytes downloaded and the number of bytes pending download, the percentage completed, the estimated time until download completion, and the number of videos to be downloaded in advance of a given video. We use the phrase "queued for downloading" to include, for example, scheduled to be downloaded to the mobile device but not yet completely downloaded to the device.
- The system may download to the mobile device metadata along with the video item.
- Metadata may include, for example, a title, description, parental rating, closed-captioning, and an image corresponding to the video item.
- The system may enforce time windowing on the downloaded video item. We use the term "time windowing" broadly to include, for example, any controlling of the times or time period during which a downloaded video item may or may not be played, e.g., a date after which (or before which or both) the video item is automatically made unplayable. At the time of forced expiry (the end of the time window), for example, the stored video item may be rendered unplayable or may be deleted from the device. Digital rights management (DRM) technologies, such as available from Adobe, Microsoft, SecureMedia, and Widevine, are one mechanism for enforcing the unplayability of a video based on the time windowing.
- The system may perform downloading in the background. We use the term "in the background" to include, for example, any process that begins without requiring intervention by a user and/or that proceeds without notifying the user of the download's start, progress, or completion. For example, a user can specify that they want to download all new episodes of a TV show. The app can then download to the device all new episodes of the TV show, as the episodes become available. The user need not explicitly initiate or even be aware that a particular item is downloading. As another example, the app may automatically select video items that are likely to be of interest to the user (based, for instance, on other video items the user has recently viewed) and automatically download these items to the user's device; again in this case, the user need not explicitly initiate or request for a specific video item to download.
- The user may receive an alert or "notification" by email, text message, or a visual or audible indicator on the mobile device, to indicate, for example, that the video has been successfully downloaded in full to the device and is now available for playout. (We sometimes use the word video interchangeably with the phrase video item.)
- The system may perform downloading according to a set of rules that govern when downloading is permitted. For example, only when the device has more than 500 MB of free space, only when the device has more than 75% battery charge, or only when the device has a WiFi connection, or some combination of any two of these and other rules.
- The system may download video items from a remote server on the public Internet, using standard protocols such as HTTP, TCP, and/or UDP.
- The system may download video items from another device, such as a smartphone, tablet, PC, game console, or conventional digital video recorder (DVR). In each case, the source device (from which the video items are downloaded) contains a magnetic disk drive, solid-state memory, or other persistent storage device where video items are stored.
- The system may download video items from a network or "Cloud" digital video recorder, which is a DVR in which the video items are stored not on the DVR itself, but on a remote network server.
- The downloading may occur through some combination of broadband networks, WiFi, and Bluetooth. In some cases, the downloading may occur through a cable that attaches the source device to the target device.

The system may allow the user to configure some or all aspects of the behavior listed above.

FIG. 9 illustrates a mobile device screen shot for an example VOD download system. The app presents the user a list or gallery 290 of videos that can be selected for downloading. The gallery may be grouped into broad categories 298, such as Classic TV. Listed items may display the title's name 300, cover art 302, and genre 304. Selecting an item may bring up an additional screen, FIG. 10, with further description of the title 306, runtime and video size information 308, and the option to stream the video now 310 ("Watch Now") or download the video for later viewing 312.

As shown in FIG. 11, the app can also present to the user a view of videos 384 that have been downloaded 386, or are in the process of being downloading 388, or are queued for download or may present any combination of those. These are videos that the user has explicitly requested to download, episodes of a series that the user has subscribed to, or videos that some other system element (for example, a recommendation engine) has elected to deliver to the device, for example. This view may be interactive: the user can see the progress 292 of pending downloads, and play 294 or delete 296 any of the fully-downloaded videos. The user may be able to pause, resume, and cancel a single or two or more queued downloads, or all queued downloads. Invoking the edit button in the upper right-hand corner of the screen brings up a menu that enables the user to delete downloaded items.

Apple® in its developers conference (WWDC) 2013 described operating steps of an app that could offer access at a device to episodic TV content by downloading a file stored on a server:

1. The app displays on the device a catalog of available episodic TV shows.
2. From the catalog, a user subscribes to one or more episodic shows.
3. When a new episode of one of the subscribed TV shows is available, the server delivers a signal to the device to alert the app to the existence of the new episode. Alternatively, the app itself may regularly poll the server to see if a new episode is available.
4. When a new episode is found to be available, the app signals the MFD system of the OS of the device to queue the new episode for download.
5. The MFD system downloads the new TV episode from the CDN. The MFD system may continue to download the episode even if the app exits or is terminated.
6. When the MFD finishes, it signals the app.
7. The app may display a notice to the user that the new episode is ready to view.

Downloading Streaming Media Objects

Figure 2:
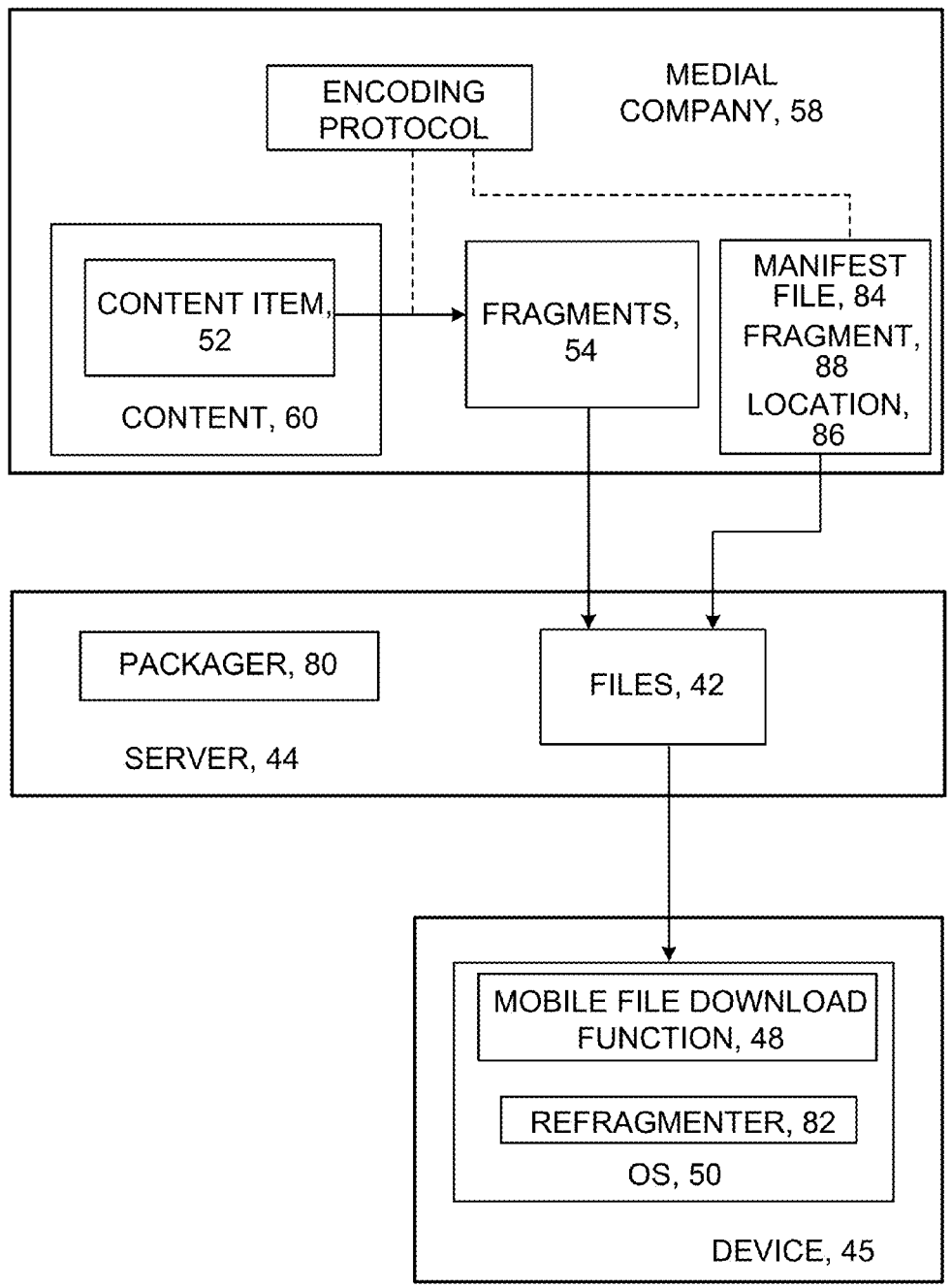

As shown in FIG. 2, we describe downloading 40 a number (potentially a very large number, such as hundreds or thousands or more) of files 42 (such as TV show files or video files or other media files or other content files) from a server 44 to a device 46, for example, a mobile device. In some implementations, the files can be downloaded using a download facility 48 available at the device, for example, from its OS 50, such as an MFD facility of an OS running on the device.

The downloading of a large number of files can be useful, for example, when a content item or media item or video item 52 (e.g., a TV show or movie) has been transformed into many small, individual files 54, often called "fragments" (each typically a few megabytes (MB)). The fragments are formed using an encoding protocol 56 such as HTTP Live Streaming (HLS), Microsoft Smooth, or HTTP Dynamic Streaming (HDS) that formats each of the fragments so that it is suitable for streaming to a user device. A 60-minute TV show may be encoded in about 2000 individual HLS fragments, for example.

Many media companies 58 such as TV networks and TV distributors store their online content 60 in one of these streaming formats.

Although we use, as an example, the downloading of a very large number of relatively small fragments, our description also applies when there are relatively fewer fragments of larger size.

Although we discuss our techniques and systems primarily using examples of pre-recorded media objects (the delivery of which we sometimes refer to as VOD or "video on demand"), the techniques and systems apply broadly to a wide variety of contexts, for example, to the downloading of a live show or event, e.g. a football game. In the case of a live event, the content object is stored on the CDN as it is created. A mobile device may download the content object as quickly as it is created.

Typically an MFD facility downloads only one file at a time in response to a request to download a file. If a user of a device wishes to view a 60-minute video that has been stored in the server as thousands of individual streaming-formatted fragments, each of which is a file, a corresponding number of requests would have to be made to the MFD by an app running on the device and in turn by the MFD to the server. Making thousands of requests to a typical MFD degrades its performance or may cause it to fail.

Another example arises when an app on the mobile device detects that a new episode of a TV show is available. The user may want to download all new episodes of the TV show to the mobile device, and the TV episode may not be a single file, but hundreds or thousands of fragment files. In this case, step 5 above will not be effective because the MFD will download only one of the files and then stop until another request is received by the MFD from the app. The app may attempt to request that the MFD download all fragments comprising the media object, but an MFD system is typically incapable of managing the download of hundreds or thousands of individual files.

By using the download facility available on a device to download multiple files (in some cases, a very large number of files) in response to a single request from an app running on the device, it becomes possible to download effectively the hundreds or thousands of individual streaming-formatted fragment files that are stored on a server and represent a full video such as a TV show.

In some implementations, a media file that has been stored at a CDN as hundreds or thousands of individual fragment files can be processed to enable all (or groups of large numbers) of the fragments to be downloaded by the MFD to a user device. At the user device, the downloaded information can be reconstituted as the original streaming-formatted fragments for play out on the user device.

We sometimes use the term "packager" to refer to software 80 (running, for example, at the server) that processes the TV show to enable the fragments to be downloaded efficiently in a way that we describe later, and we sometimes use the term "defragmenter" to refer to software 82 running on the mobile device that processes the downloaded information to reconstitute the original fragments for play out. The packager and the defragmenter work cooperatively.

Typically, when a single video file is encoded as a large number of fragments using one of the streaming-format protocols, the software that creates the fragments also creates a single manifest file 84 that lists the locations 86 of all of the constituent fragments 88 on the server. (We use the term "manifest" broadly to include, for example, any kind of list of files or other items; a manifest sometimes includes information about each of the items, such as its location.)

Traditionally, when an app running on a user device, for example, an Internet-connected mobile device, is to play out the video on the user device, the app fetches and reads the stored manifest file from the server. It can then use the list contained in the manifest file to locate on the server and then stream to the user device each of the streaming-formatted fragments, one by one in sequence, for play out of the entire video.

For a variety of reasons, however, the user device may not be able (or for a variety of reasons it may be undesirable, unsuitable, inconvenient, unwise, or inappropriate; we sometimes refer to any of these reasons as being a reason why it is "unsuitable" to stream or download information) to stream the succession of fragments for play out to the user at the time when the user wants to view the video. For example, the user may want to view the video at a time later than when the video becomes stale and no longer available from the server. Or the user may want to view the video at a time when she is located in a place where there is no connection available to the server, for example when she is flying on an airplane. Even at the time when a connection is available, the connection may be of a low quality or may be expensive under the terms of the user's agreement, the remaining battery life at the device may be short, storage on the device may be low, or any combination of two or more of these factors may come into play.

Therefore, in some circumstances, it is desirable to be able to download the video at one time, or piecemeal at a small number of times, to the device and store it there for play out. As explained earlier, a typical MFD facility is not able to efficiently or effectively download all of (or large groups of) the fragments to the device.

In some cases, by using the following techniques and systems, for example, a media file or content file that has been broken into a large number (e.g., a very large number) of fragments (such as streaming-formatted fragments) can be downloaded effectively to a device for later play out.

For example, as shown in FIG. 3, to download to a user device an entire TV show that has been encoded and stored at a server in streaming-format fragments (together with a manifest file), rather than streaming the individual fragments one after the other, an app running on a device could perform the following steps:

1. Download (102) the manifest file 101.
2. Parse the manifest file to determine URLs (or other pointers 103) to the fragments (104).
3. Download the fragments 105 from the CDN, one by one, and store them on the device (106).
4. Generate a new manifest file 107 that points to the downloaded fragments in their locations on the device (108).

As shown in FIG. 4, the original manifest file 110 as originally copied from the server and stored on the device includes a list of entries 112 each of which identifies a fragment 114 by a unique identifier 116 and provides a pointer (in this case a URL) 118 indicating the Internet location of the fragment. The manifest file may also contain, as indicated by the parenthetical (for example (on CDN)) a flag that indicates whether the file is located on the CDN (that is, not located on the local device) or is located on the local device. The middle version of the manifest file 120, which is an updated version of the original manifest file, indicates a situation in which all fragments have been downloaded. The bottom version of the manifest file 122, which is also a different updated version of the original manifest file, indicates a situation in which half of the fragments have been successfully downloaded to the local device and the other half remain at the CDN and have not been successfully downloaded. In FIG. 4, when a fragment is indicated as being on the CDN, the URL is a pointer to the network address of the fragment on the CDN. When a fragment is indicated as being on the local device, the URL is a pointer to the address of the fragment on the local device.

As shown in FIG. 3, in the process of downloading the fragments, after the original manifest file has been parsed, if no more fragments remain to be downloaded 130, the download process exits 132. Otherwise, if conditions are not acceptable for downloading 134, the process waits 136 until conditions are acceptable. Then the next fragment is downloaded 106 and the URL for the downloaded fragment is rewritten in the updated manifest file on the device.

Figure 5:
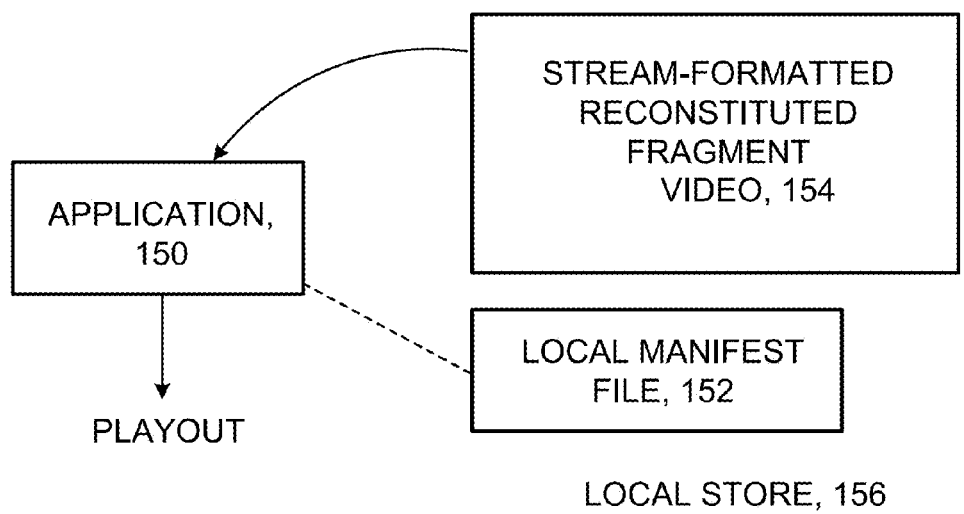
Figure 6:
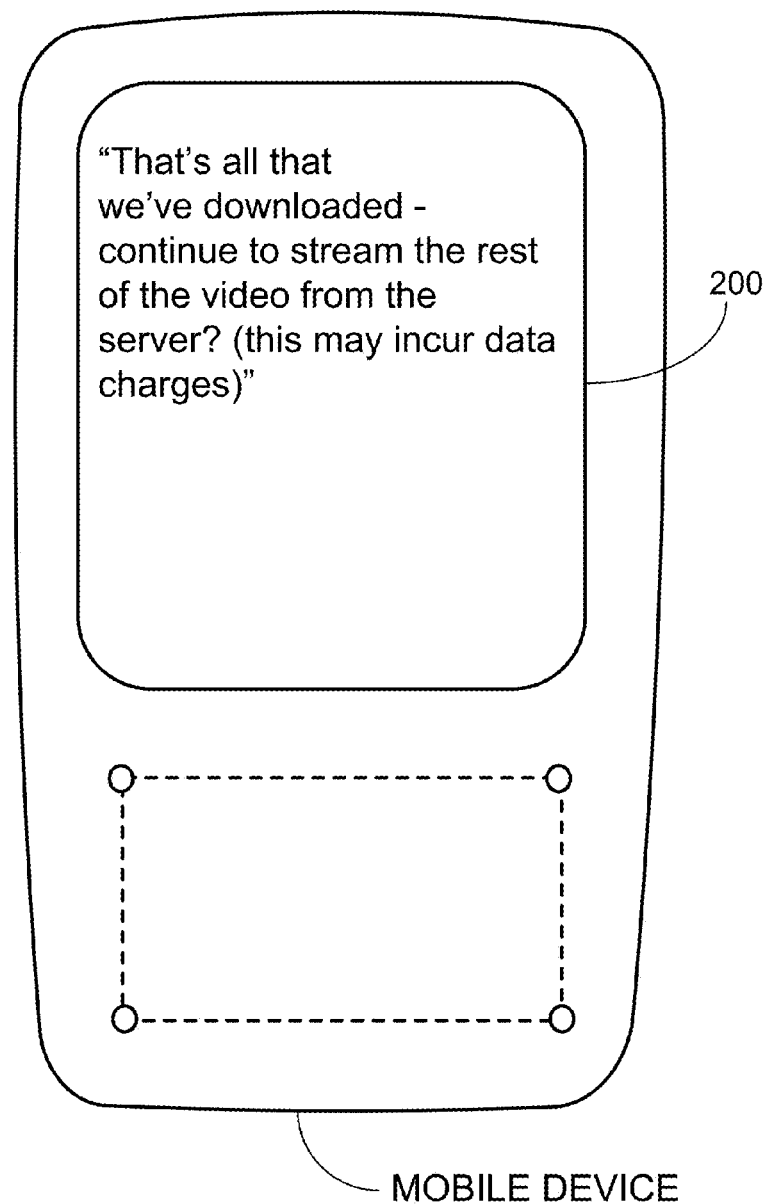

As shown in FIG. 5, once the fragments have been stored on the device, and the local version of the manifest file has been updated, any app 150 (such as a media player) on the device can read the new (or as we sometimes say, updated) locally stored manifest file 152 just as it would have read the original manifest file at the server, and can then stream and play out the video 154 (fragment by fragment, in sequence) from the local file store 156 on the device, just as it would have streamed the video fragments from the CDN, even if the device lacks network connectivity or the fragments could not be effectively streamed from the server at the time of play out.

The steps 1 through 4 listed above can be enhanced, optimized, supplemented, and improved to make the process faster, more efficient, more reliable, or more useful in a wide variety of ways.

For example, step 3 could be enhanced by downloading the fragments in parallel, up to five or more at a time. For example, the application may create multiple tasks (sometimes called "threads") each of which is responsible for the download of a succession of fragments as indicated in the example shown in the table below in which there are 30 fragments divided among 5 tasks. Each of these download tasks runs independently of the others. For instance:

| TASK | FRAGMENTS |
| --- | --- |
| A | 1, 6, 11, 16, 21, 26 |
| B | 2, 7, 12, 17, 22, 27 |
| C | 3, 8, 13, 18, 23, 28 |
| D | 4, 9, 14, 19, 24, 29 |
| E | 5, 10, 15, 20, 25, 30 |

Because of the way in which the operating system allocates resources to the tasks A though E and the way in which each tasks can execute successive downloads of fragments when the successive fragments are divided among tasks in this way, this approach is faster than if a single thread were to execute all of the downloads of all of the fragments.

This approach increases the effective throughput during download, and thus decreases the total amount of time the download requires. This optimization applies in the case of a media object that is pre-recorded and stored in its entirety on the remote server at the time of access. For live content, downloading can only occur as fast as fragments of the media object are being written to the remote server.

In some implementations, a process running on the device may rewrite the original manifest to form and store the new manifest, as shown in FIG. 4, during the same period of time when the fragments are being downloaded.

In some cases, the play out of the video being downloaded can begin after some of the fragments have been downloaded (if some or all of the new manifest file has been generated), by streaming those fragments from the local storage, even though the rest of the fragments have not yet been received from the CDN. The streaming and play out can continue (fragment by fragment) from the local file store on the device up to and including the very last downloaded fragment, even if the device lacks network connectivity. If the mobile device does have network connectivity, it can continue to play the video past this point by streaming the remainder of the fragments from the remote server in the typical way. As shown in FIG. 6, in this case, the app on the mobile device may prompt 200 the user to confirm she wishes to stream the non-downloaded part of the show.

In some implementations, the packager can deliver the video file to the MFD in response to the MFD request, even while the packager is engaged in fetching the original fragments from the remote server and preparing them for download.

In some cases, the defragmenter can reconstitute and store the fragments at the device, even while the downloading of other fragments is in process.

In some instances, the packager can start at any arbitrary fragment in the original group of fragments (as opposed to starting always at the first fragment). This means that in case the network connection between the packager and the MFD is terminated, or the MFD stops the download, the MFD and packager can pick up where they left off in the download process, without starting at the beginning and unnecessarily again downloading fragments that already been downloaded.

In an example implementation, discussed below, we use the following terms:

TOTAL_FRAGMENTS: the total number of fragment files that represent the complete TV show (e.g., 1744 fragments).

MANIFEST_URL: the Internet location of the manifest for the TV show to be downloaded. For instance, http://www.cdn.com/video1.m3u8

PACKAGER_URL: Location of Packager, for instance www.packager.com

UUID: A universally unique identifier of a fragment.

Figure 7:
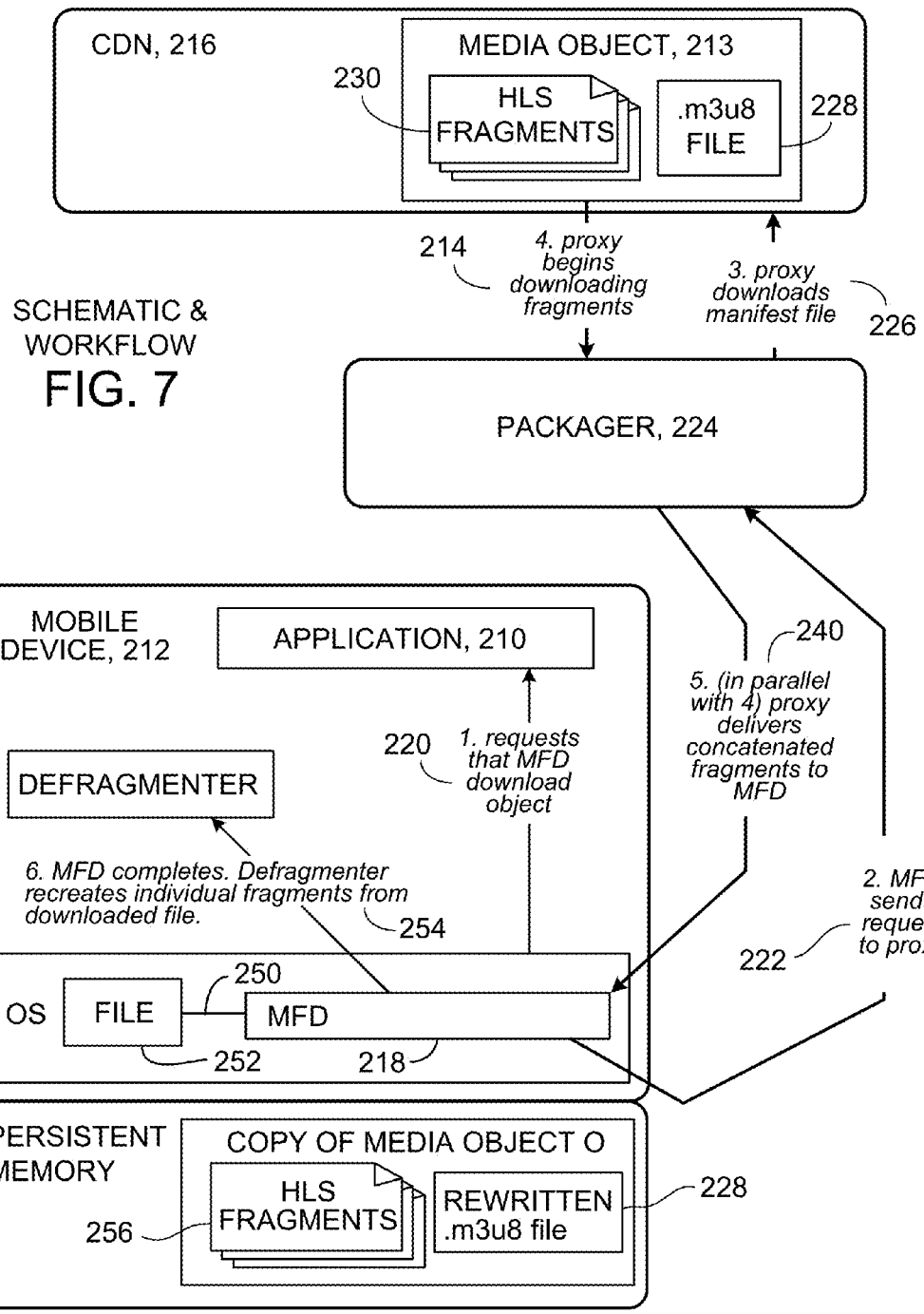

As shown in FIGS. 7 and 8, an app 210 running on a mobile device 212 can download a fragmented video item 213 from the CDN 216, using the MFD 218 available on the mobile device as follows.

1. The app requests 220 the MFD to queue a download using the address URL: PACKAGER_URL/?file=MANIFEST_URL&fragment_start=1

2. The MFD initiates 222 a download at that address.

3. The packager 224 receives the download request 226 from the MFD.

4. The packager downloads the manifest file 228 at MANIFEST_URL from the CDN.

5. The packager parses the manifest file; begins downloading fragments 230 beginning with the fragment that corresponds to a fragment offset requested by MFD (in this case, 1; in other cases, the MFD can indicate a higher offset to avoid having previously downloaded fragments unnecessarily downloaded again).

6. The packager begins sending 240 concatenated fragments 243 to the MFD as (if they are) part of a single file 245; the packager inserts a fixed-length delimiter 247 before each subsequent fragment; the delimiter specifies a fragment ID (that is, the number of the fragment, for example, 1113) and an expected size 249 of the fragment (for example, 1.2 M).

7. The MFD at the local device then writes 250 (to a single file 252 that has been opened in the OS's file system) all bytes as they are received from packager in the concatenated sequence of fragments.

8. The MFD stops downloading (for whatever reason)

9. The MFD sends a signal to the app that the MFD has stopped downloading and provides a pointer to the downloaded file on the disk.

10. The app applies a DEFRAGMENT algorithm 254 to parse the concatenated file and re-form the original fragments 256. The algorithm returns to the app the value LAST FRAGMENT ID=fragment number of last successfully-downloaded fragment.

11. If the value LAST_UUID<TOTAL_FRAGMENTS, then the app requests the MFD to queue download from the location http://www.proxy.com/?file=MANIFEST_URL&fragment_ start=LAST_UUID+1, which indicates to the packager the ID of the next fragment to be downloaded to the device.

Once the concatenated downloaded file has been stored on the device, the fragments can be reconstructed and the UUID of the most recently successfully downloaded fragment can be determined, as follows.

1. The defragmenter parses the first delimiter in the downloaded file, which contains UUID and N=expected size of the first fragment.

The defragmenter scans ahead N bytes in the downloaded file.

If a new delimiter is found in these N bytes, or if fewer than N bytes remain to be read in the downloaded file then this fragment is discarded and the value LAST_UUID=UUID−1 is returned to the app.

The defragmenter writes the N bytes to the local storage as the next fragment.

In some cases, the packager runs on machines that are as close as possible, in a network sense, to the files to be downloaded, which reduces the number of network "hops" (through intermediate switches, routers, hubs, and so on) that are required each time the packager is to fetch one of the fragments for processing.

In large-scale deployments, the number of mobile devices concurrently accessing the packager may be a large. In some implementations, the packager can be running on multiple servers, and a set of load-balancer machines (e.g. F5) will distribute the computational load across those servers.

Other implementations are also within the scope of the following claims.

The invention claimed is:

1. A method comprising storing at a first server individual video files that are each expressed in a video streaming format and together comprise a video, downloading at least some of the individual files from the first server to a second server, packaging at the second server at least some of the downloaded files in a single larger file, downloading the single larger file to a persistent storage at the mobile device, refraining from playing out at the mobile device any of the individual files while the single larger file is being downloaded, and when the mobile device has access to a cellular data connection but lacks access to a WiFi network connection, playing out the individual files that have been restored from the single larger file as a presentation of the video on the mobile device.

2. The method of claim 1, in which the mobile device comprises a mobile phone.

3. The method of claim 1, in which the mobile device comprises a tablet.

4. The method of claim 1, in which the mobile device displays a notification indicating that the video has been downloaded.

5. The method of claim 1, in which the mobile device displays a notification indicating that the video is available for playing.

6. The method of claim 1, in which the mobile device displays information that identifies the video and other videos that have been previously downloaded and are then stored on the mobile device.

7. The method of claim 1, in which the mobile device displays information that identifies the one or more videos that are in process of being downloaded.

8. The method of claim 1, in which the video comprises a movie.

9. The method of claim 1, in which the video comprises a TV show.

10. The method of claim 1, in which the downloading process is initiated by an application running on the mobile device.

11. The method of claim 1, in which the downloading is initiated by a signal sent from the second server to the mobile device.

12. The method of claim 1, in which the downloading is provided by the operating system of the device.

13. The method of claim 1, in which the single larger file contains information indicative of the beginning of each of the individual smaller files contained in the single larger file.

14. The method of claim 13, in which the indicative information includes a unique identifier for each of the individual smaller files in the single larger file.

15. The method of claim 1, in which each of the requests includes an indication of which individual smaller files belonging to the video have already been downloaded to the mobile device.

16. The method of claim 1, in which the video is delivered through a content delivery network (CDN).

17. The method of claim 1, in which the video includes commercials.

18. The method of claim 1, in which the video comprises a live stream.

19. The method of claim 1, in which the video belongs to a catalog of video-on-demand items.

20. The method of claim 1, in which the video is downloaded from a digital video recorder (DVR).

21. The method of claim 20, in which the DVR comprises a network DVR or a "cloud" DVR.

22. The method of claim 1, in which the streaming format comprises HTTP Live Streaming (HLS).

23. The method of claim 1, in which the streaming format comprises Microsoft Smooth Streaming (HSS).

24. The method of claim 1, in which the streaming format comprises HTTP Dynamic Streaming (HDS).

25. The method of claim 1, in which the packaging into a single larger file is done on one second server.

26. The method of claim 1, in which the packaging into a single larger file is done on multiple second servers.

27. The method of claim 26, in which one or more load-balancer machines distribute the computational load of the packaging across the second servers.

* * * * *